Oct. 18, 1932. S. A. SNELL 1,883,033
FRONT FORK ASSEMBLY FOR JUVENILE VEHICLES AND METHOD THEREFOR
Filed Aug. 17, 1931 2 Sheets-Sheet 1
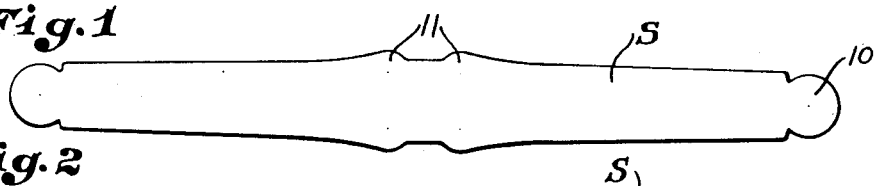
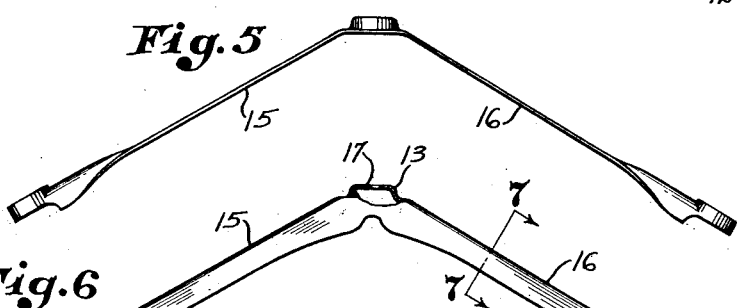
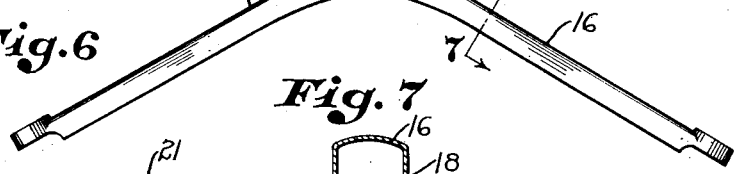
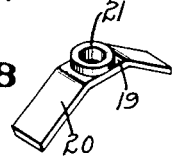
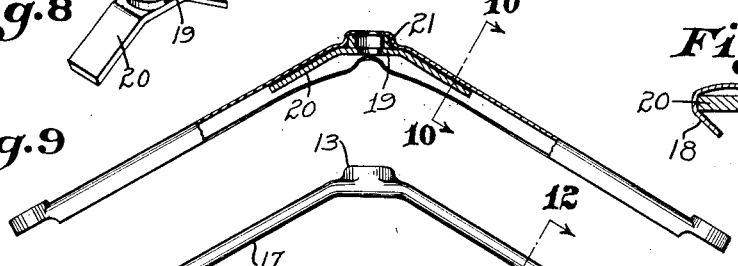
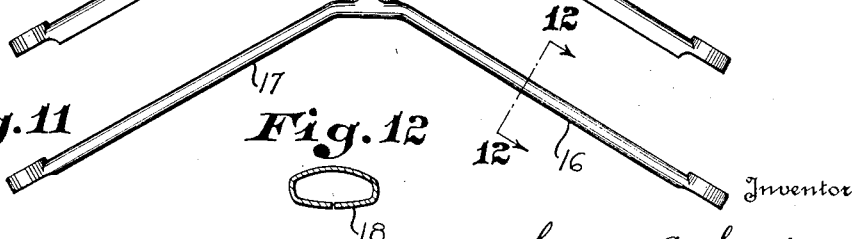
Inventor
Samuel A. Snell
By Owen & Owen
Attorneys

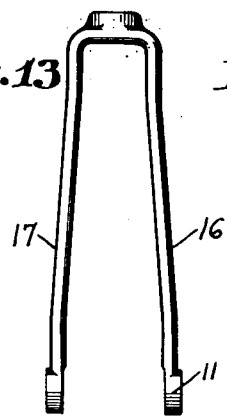
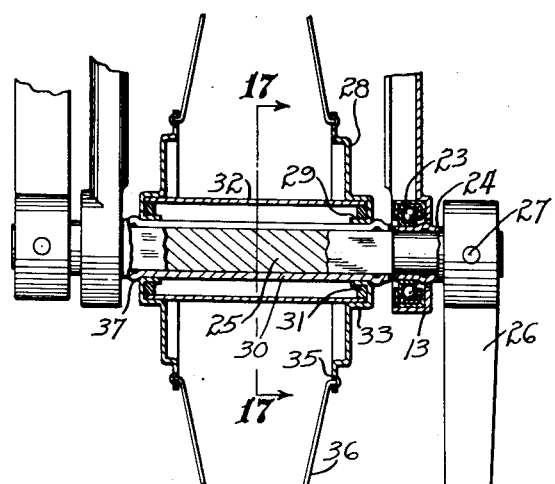
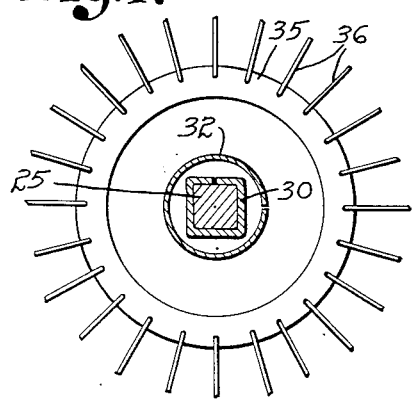
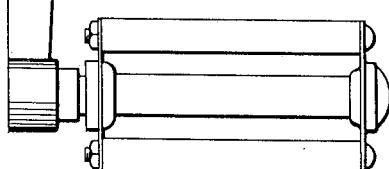

Patented Oct. 18, 1932

1,883,033

UNITED STATES PATENT OFFICE

SAMUEL A. SNELL, OF TOLEDO, OHIO, ASSIGNOR TO THE AMERICAN-NATIONAL COMPANY, OF TOLEDO, OHIO, A CORPORATION OF OHIO

FRONT FORK ASSEMBLY FOR JUVENILE VEHICLES AND METHOD THEREFOR.

Application filed August 17, 1931. Serial No. 557,430.

This invention relates to juvenile vehicles, but more particularly to front axle forks and front axle assemblies for children's vehicles such as velocipedes.

Heretofore in the manufacture of children's velocipedes, the front axle forks have been made from malleable iron, the outer end portions being formed separately and bolted in place in order that the bearings properly align with each other. This has in practice proved decidedly objectionable since after the vehicle has been used for a while, the bolts become loose and the alignment of the bearings so disturbed as to interfere materially with the smooth operation of the vehicle. Although attempts have been made to secure the nuts to the bolts so as to militate against their coming loose, these endeavors have not completely met with success. It has, therefore, been a desideratum to connect these bearing elements rigidly and preferably integral with the body of the fork.

An object of this invention is to overcome the above difficulties and to produce a fork with which the axle bearing elements are integral.

Another object is to produce a simple and efficient method of manufacturing front axle forks for juvenile vehicles from sheet metal.

A further object is to produce a fork for a juvenile vehicle and an axle assembly therefor, having the new and improved features of construction and arrangement hereinafter more fully described.

For purposes of illustration, but not of limitation, an embodiment of the invention is shown in the accompanying drawings, in which—

Figure 1 is a plan view of a sheet metal blank from which the fork is formed. Fig. 2 is an edge view of the blank shown in Fig. 1. Fig. 3 is a plan view of the blank showing the bearing elements formed in the opposite ends and the intermediate bearing portion stamped therefrom. Fig. 4 is an edge view of the strip shown in Fig. 3. Fig. 5 is an edge view showing the next step in the manufacturing process in which the side arms are partially bent toward each other. Fig. 6 is the side elevation of the next succeeding step in which the longitudinal edge portions of the arms are bent inwardly at substantially right angles thereto. Fig. 7 is a sectional view on the line 7—7 in Fig. 6. Fig. 8 is a perspective view of the reinforcing plate which is applied to the fork, and the bearing ring mounted on the plate. Fig. 9 is a side elevation of the fork with the reinforcing plate and ring in place with the partially bent portions of the side arms bent inwardly at a greater angle and toward each other. Fig. 10 is a sectional view on the line 10—10 of Fig. 9. Fig. 11 is a side elevation of the fork, the longitudinal side edge portions of the side arms being bent into substantially abutting position. Fig. 12 is a sectional view on the line 12—12 of Fig. 11. Fig. 13 is a front elevation of the fork after the side arms are bent toward each other into substantially parallel relationship. Fig. 14 is a side elevation of the fork shown in Fig. 13. Fig. 15 is a side elevation showing the final bend imparted to the side arms. Fig. 16 is an enlarged sectional view of the outer end of the fork and the axle assembly therefor, and Fig. 17 is a transverse sectional elevation on the line 17—17 of Fig. 16.

The illustrated embodiment of the invention comprises a method for forming the front fork of a juvenile vehicle, the first step of which is to stamp out a strip S of sheet metal of suitable gauge into the form shown in Fig. 1, in which rounded ends 10 are provided and pairs of laterally extending projections 11 adjacent the central portion of the strip are provided on opposite sides thereof. After the blank has been formed in this manner, it is placed in a suitable die to form the rounded ends 10 into cups 11 which are rounded or substantially annular in shape. In this operation, the portions 12 of the metal adjacent the cups are also bent inwardly as indicated in Figs. 3 and 4. At the same time the bearing cups 11 are formed, a portion of the metal between the pairs of projections 11 is formed into a raised portion, the sides of which incline outwardly toward the body of the strip. In the next succeeding step openings 14 are punched in the bearing cups 11 to receive the axle of the wheel, as will hereinafter appear.

Thereafter the portions on opposite sides of the raised bearing portion 13 are bent inwardly toward each other providing arms 15 and 16 disposed approximately at an angle of the order of 120°. The next step in the process is to punch an opening 17 in the bearing portion 13. While the arms 15 and 16 are in this position, the opposite longitudinal side edges thereof are bent inwardly at substantially right angles to the respective arms providing portions 18, as indicated in Fig. 7.

In order to reinforce the fork in the region of the bend and assist in the subsequent shaping operation to militate against the metal buckling, a metal plate 19 having end portions 20 thereof bent at an angle to the intermediate portion, is inserted between the bent portions 18 in the region of the bearing projection 13. Prior to the insertion of the plate 19, a split ring 21 is inserted inside of the bearing portion 13. With the parts in this position, the side edge portions 18 are bent inwardly toward each other, as indicated in Figs. 9 and 10. Thereafter the side edge portions 18 are completely bent so that their free edges are in close juxtaposed relation and the arms in cross section are in the form of a split flattened tube.

After the side edge portions 18 have been bent into the shape indicated in Fig. 12, the side arms 16 and 17 are bent toward each other into substantially parallel relationship, as shown in Fig. 13, with the outer end portions inclining outwardly at a slight angle. The final step in the formation of the fork consists in imparting a slight forward bend as indicated at 22 to the lower end portions of the arms 16 and 17.

As shown in Fig. 16, ball bearing units 23 are disposed within the cup-shaped bearing elements 13, one race thereof being secured to a sleeve 24 which engages the outer end of an axle 25. A pedal arm 26 fits over the outer end of the sleeve 24 and the pedal arm, sleeve and axle are secured together by pin 27. It is to be understood that the construction on both ends of the axle is the same, and description of one side is deemed sufficient.

The wheel includes a pair of metal side plates 28 having inwardly bent ends 29 in frictional contact with a sleeve 30, which fits over the axle 25. As indicated in Fig. 17 the sleeve 30 is of one piece and the intermediate portions of the axle and sleeve are square in cross section. A ring 31 fits over the outside of the inturned or flanged end 29, and fitting over the ring 31 is a sleeve 32 of one piece construction, as indicated in Fig. 17.

It will be noted that the plate 28 extends inwardly at 33 in embracing relation to the sleeve 32 and in parallel relation thereto. From the horizontal portion 33 the plate 28 extends at substantially right angles, extending inwardly at 34 and then outwardly, as shown at 35. Connected to the portion 35 of the plate 28 are spokes 36. For preventing sidewise movement of the above assembly, beads 37 project outwardly from the opposite end of the sleeve 30 in the region of the outer edges of the adjacent plates 28.

From the above description, it is manifest that I have provided an exceedingly simple method for manufacturing forks for juvenile vehicles from a single strip of sheet metal. An outstanding feature of this method resides in the forming of the bearing cups 11 integrally with the side arms so that difficulties heretofore experienced with the bearing elements coming loose after a comparatively short period of use, is obviated. The reinforcing and forming plate 19 is also of importance in that it enables the side arms to be bent toward each other without liability of the metal buckling to any material extent, and since a tapered opening is formed through the projection 13, ring 21 and plate 19, the plate and ring provide additional metal in which such opening may be formed to receive the steering post.

It will be apparent that the axle assembly is extremely simple and can be manufactured inexpensively. Nevertheless, this construction is exceedingly sturdy and will effectively withstand hard and continued use.

It is to be understood that numerous changes in details of construction, arrangement and operation may be effected without departing from the spirit of the invention, especially as defined in the appended claims.

What I claim is:

1. A device of the class described comprising a one piece sheet metal fork having substantially parallel arms, bearing elements on the ends of said arms, a reinforcing plate disposed in the crotch of said fork and having substantially parallel side portions to reinforce the inner ends of said arms, and a bearing member on said plate to receive a steering post.

2. A device of the class described comprising a one piece sheet metal fork having substantially parallel arms, integral cup-shaped bearing elements on the ends of said arms, longitudinally extending inwardly bent side edge portions on said arms providing a flattened tubular formation, an integral raised post-receiving bearing element on the inner end of said fork, a plate disposed on the under side of said fork in the crotch of said fork having substantially parallel end portions to reinforce the inner ends of said arms, and an annulus within said raised portion for strengthening the same, said annulus abutting against said plate.

3. A device of the class described comprising a one-piece sheet metal fork having substantially parallel arms, integral cup-shaped bearing elements on the ends of said arms, said arms having longitudinally extending inwardly bent side edge portions shaped to provide a substantially flattened tubular formation of the fork, an integral raised post receiving bearing element on the inner end of said fork, a plate conforming to and housed within the crotch of said fork and a ring-like part disposed within said post receiving element and seating on the plate at its base, said plate having substantially parallel end portions received within the tubular arms of the fork whereby to reinforce the same.

4. A device of the class described comprising a sheet metal fork having approximately parallel arms, a ball-race-receiving cup integral with the end of each arm, said cups being an axial alignment with each other, each cup comprising an annular portion pressed outward beyond the adjacent portion of the arm to form a socket, and an inwardly turned flange about the annular portion and extending from one edge of the adjacent arm to the other edge of the adjacent arm.

5. A device of the class described comprising a sheet metal fork having approximately parallel arms, each arm having edge portions bent inwardly and then toward each other to provide a substantially flattened tube, a ball-race-receiving cup integral with the end of each arm, said cups being in axial alignment with each other, each cup comprising an annular portion pressed outward beyond the adjacent portion of the arm to form a socket, and an inwardly turned flange about the annular portion and extending from one edge of the adjacent arm to the other edge of the adjacent arm, said tubes terminating in close juxtaposition to said flanges respectively.

In testimony whereof I have hereunto signed my name to this specification.

SAMUEL A. SNELL.